April 12, 1932.  W. D. BELL  1,853,252
PUMPING MECHANISM
Filed Jan. 29, 1927
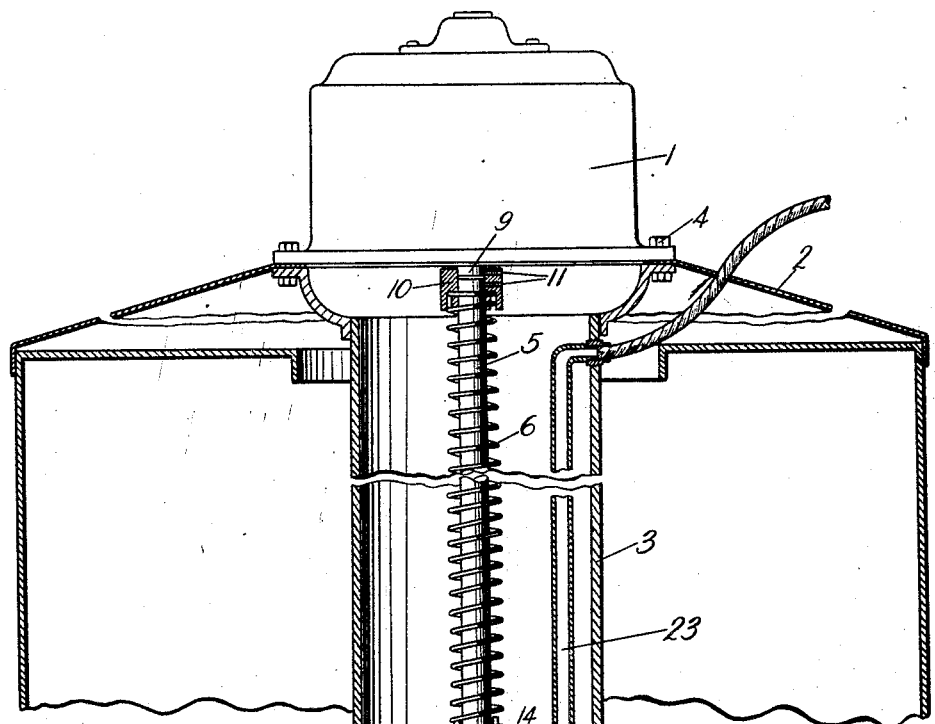
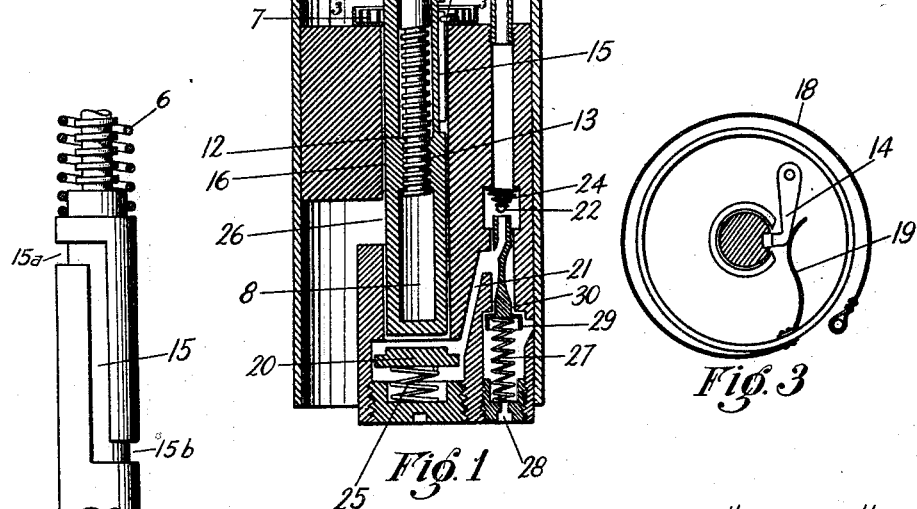
William D. Bell
INVENTOR.
BY
ATTORNEY.

Patented Apr. 12, 1932

1,853,252

UNITED STATES PATENT OFFICE

WILLIAM D. BELL, OF COLUMBUS, OHIO, ASSIGNOR OF ONE-FOURTH TO EDWIN P. CORBETT, OF COLUMBUS, OHIO

PUMPING MECHANISM

Application filed January 29, 1927. Serial No. 164,522.

My invention relates to a pumping mechanism, particularly that type adapted to be driven by an electric motor.

As set forth in the following description, this motor driven pumping mechanism is utilized to direct lubricant to the various parts of an automobile or other machine requiring lubrication and has particular reference to those devices which force the lubricant into the proper conduits or crevices under pressure.

The usual drive for a pumping mechanism of this kind is accomplished by means of a crank or its equivalent, a spur gear and pinion, or a worm and gear. Such drives are costly, bulky, noisy, and, unless well made inclined to wear rapidly. In order to make use of an electric motor to operate a plunger pump it is necessary not only to convert the rotary motion of the motor into a reciprocating motion but it is also necessary to provide a means for reducing the comparatively high speed of the motor to a rate suiting the requirements of the pump.

My invention preferably takes the form of a discharge chamber with a motor operated plunger reciprocating therein. This plunger is reciprocated as long as electric current is supplied to operate the electric motor. My invention also comprises means for keeping the discharge chamber in constant communication with the original grease container except during the time in which actual discharge takes place, and means for relieving the pressure built up by the constant reciprocation of the piston when the outlet tube leading to the automobile or other machine is closed.

One object of my invention is to provide a motor driven pumping mechanism adapted to deliver lubricant from the original container to the automobile or machine requiring lubrication.

Another object of my invention is to provide means for converting the rotary motion of a motor into a reciprocating motion and to reduce the comparatively high speed of the motor to a rate suiting the requirements of the pump.

A still further object of my invention is to provide a motor driven pumping mechanism that may be inserted into and withdrawn from the original grease container while the various parts are in assembled relation.

Other and further objects of my invention will appear from the detailed description hereinafter set forth, and the preferred embodiment of my invention is shown in the accompanying drawings wherein similar characters of reference designate corresponding parts and wherein:

Figure 1 is a vertical horizontal cross section showing the various features of my invention.

Figure 2 is an elevational view of the keyway which is adapted to receive a pawl for holding the piston against rotation.

Figure 3 is a cross sectional view taken on the line 3—3 of Figure 1 of the shock absorbing spring, the floating collar, the pawl and the spring for forcing the pawl into the keyway.

With reference to Figure 1 of the drawings, the numeral 5 represents a shaft. This shaft is securely fastened to the motor shaft 9 by means of the collar 10 and the set-screws 11 and has a thread 12 generated on the opposite end thereof.

A pump piston 8 operates in the cylinder 16 of the pump and is internally threaded as at 13 to engage the thread 12 of the shaft. The thread 12 may be of any convenient pitch to give the piston the desired number of strokes per minute.

The shaft 5 is surrounded by a helical torsion spring 6 having one end rigidly attached to the shaft 5 at the collar 10 and the opposite end rigidly attached to the top of the piston 8.

A collar 7 that is capable of rotative movement to the extent of the movement necessary to "wind up" the spring 18 on the circumference of the collar, but is held against vertical movement in any well-known manner, is disposed on the piston 8 as shown in Figure 1. Pivotally attached to this floating collar 7, as shown in Figure 3, is a pawl 14. This pawl is adapted to engage a vertical keyway 15 in the piston 8 to prevent rotation of the piston while such piston is moving downwardly. The reason for this will later be apparent.

In Figure 3 of the drawings, I have shown the coil spring 18 that is provided to absorb the shock that occurs when the pawl 14 stops the rotation of the piston 5 as the piston reaches the uppermost point in its stroke. A spring 19 for forcing the pawl into engagement with the vertical keyway 15 is also shown in Figure 3.

In the operation of my device, the shaft 5, being rigidly attached to the motor shaft 9, rotates at a constant rate of speed under the influence of the motor 1. Assuming that the piston 8 is at the upper limit of its stroke, the pawl 14 will have engaged the vertical keyway 15 to prevent the piston 8 from rotating. At this time the action of the thread 12 which is on the lower end of the constantly rotating shaft 5 will cooperate with the internal threads 13 of the piston 8 to move the piston downwardly through the cylinder 16. This downward motion will continue until the pawl 14 and the upper horizontal extension 15a in the vertical keyway 15 become concentric whereupon the pawl 14 will pass into the horizontal portion 15a and from there to the outer surface of the piston and no longer hold the piston against rotation.

Owing to the fact that the helical spring 6 is rigidly attached at one of its ends to the rotating motor shaft and at its other end to the piston 8, which is held against rotation during its downward movement, this spring will be put under tension by being wound up. This will subject the piston 8 to a torsional stress that will tend to cause rotation of the piston, in addition to the friction between the threads 12 of the shaft 5 and the internal threads of the piston 8 and the component of forces which naturally tend to cause rotation of the piston. It will be clear that such stresses will be ineffective as long as the pawl 14 remains in the vertical keyway 15.

When the piston 8 reaches its lowermost position and the pawl 14 enters the horizontal groove 15a which gradually tapers toward the surface of the piston, the tension of the spring 6, together with the natural friction between the shaft and the piston and the component of forces acting upon the piston 8, will cause it to go into rotation in the same direction as the shaft 5 and at such speed that the pawl 14 will pass over the vertical keyway 15 without engaging it. Without the spring 6 the piston 8, when released, would naturally acquire approximately the same speed as the shaft 5 and would remain stationary with relation to vertical movement. However, the spring 6 having been "wound up" during the time that the piston 8 has been restrained from rotating, it can only "unwind" by rotating the piston 8 at a higher rate of speed than that of the shaft and in the same direction that the shaft is rotated.

On the piston 8 reaching the upper end of its stroke, the pawl 14 which has heretofore been passing over the vertical keyway 16 as a result of the speed of the piston 8 will enter the horizontal groove 15b. The pawl 14 is forced into this horizontal groove 15b and thence to the vertical keyway 15 by the spring 19 (see Figure 3) and the rotation of the piston will be stopped. The pawl 14 will then hold the piston 8 against rotation which will permit the rotating thread 12 to drive the piston downwardly, thus repeating the cycle.

When the piston 8 reaches its lowermost position and the pawl 14 enters the horizontal groove 15a, the tension of the spring 6 together with the natural friction of the shaft and component of the forces acting upon the piston 8 will cause it to go into rotation in the same direction as the shaft 5. Without the spring 6 the piston 8, when released, would acquire the same speed as the shaft 5 and would remain stationary with relation to the shaft 5. However, the spring 6 has been "wound up" during the time the piston 8 has been restrained from rotating, and it can only "unwind" by rotating the piston 8 relative to the shaft 5 at a higher rate of speed than the shaft. The stored energy "wound up" spring, when the piston is thus released from the pawl 14, serves to rotate the piston in the same direction as the shaft 5 but at a greater rate of speed. The unwinding of the spring 6 rotates the piston at such speed that the pawl 14 passes over the keyway 15 until it reaches the horizontal groove 15b at the lowermost end of the vertical keyway 15 which occurs when the piston is at its uppermost position. On reaching this horizontal groove 15b the pawl 14 is forced into it by the spring 19 (see Figure 3) and the rotation of the piston 8 is stopped. The pawl 14 holding the piston 8 against rotation allows the rotating thread 12 to drive the piston downwardly, thus repeating the cycle.

In the discharge operation, the downward stroke of the piston 8 exerts pressure on the grease in the cylinder 16. This pressure exerted on the grease opens, and forces the grease past, the valve 20. This same pressure forces the grease through the duct 21, past the ball valve 22 and into the outlet tube 23.

The pressure on the grease is relieved when the piston 8 begins its upward stroke. The pressure being relieved, the spring 24 moves the ball valve 22 to close the duct 21 and the spring 25 moves the valve 20 to close the end of the cylinder 16. Since the bottom of the cylinder is closed by the valve 20, the upward movement of the piston 8 creates a partial vacuum in the cylinder 16 and grease from the container flows into this vacuum through the port 26 immediately on the opening of the port 26 by the upward movement of the piston 8. The pump is thus automatically recharged.

Means have been provided whereby the pressure, built up by the continuous action of the pumping mechanism, may be relieved during the interval that the outlet tube 23 is closed. Otherwise, the pumping mechanism would operate against continuously increasing pressure, such pressure eventually becoming great enough to stop the action of the pumping mechanism.

The ball check valve 22, held in place by the spring 24, maintains the pressure in the outlet tube 23 when the piston 8 is on its upward stroke. If the outlet end of the tube 23 is closed, the succeeding downward stroke of the piston 8 will increase the pressure in the outlet tube 23 and this increased pressure acting on the top of the piston-valve 30 will move the piston-valve 30 downwardly. Such downward movement of the piston-valve 30 allows a small amount of grease to leak past the cutaway portion of the piston-valve 30 onto the face of the valve portion 29. The following downward stroke of the piston 8 forces the grease against the upper face of the valve portion 29, further moving the piston-valve 30 downwardly and further opening the valve portion 29. The grease is then forced around the piston-valve 30, through the port 28, and into the original container.

Immediately after the outlet tube 23 is opened, the pressure on the piston-valve 30 will be reduced and the spring 27 will move the piston-valve 30 upwardly to close the outlet to the container by the valve 29. The grease will then pass through the outlet tube 23 so long as the outlet tube 23 remains open or the pressure therein less than that required to compress the spring 27.

It will be obvious from the previous description that I have provided means whereby the pump will be automatically unloaded so long as the pressure in the outlet tube 23 is above the maximum as determined by the tension of the spring 27.

By referring to Figure 1 of the drawings, it will be readily seen that I have provided a motor driven grease pumping mechanism that may be readily inserted or withdrawn from a drum of grease without disassembling the various parts. A pressed steel disk 2 having a flange is provided for holding the motor and pumping mechanism in upright position, the flange being adapted to contact with the outside circumference of the top of a drum as shown. The motor 1, disk 2 and pump mechanism casing 3 are all held in assembled relation by the bolts 4.

In the device herein described it will be understood that I have provided a motor driven pumping mechanism adapted to deliver lubricant from the original container to the automobile or other machine requiring lubrication and have converted the rotary motion of the motor into a reciprocating motion in the simplest, cheapest and most satisfactory manner possible.

Having thus described my invention, what I claim is:

1. A pump operating mechanism comprising a rotatable shaft with threads thereon, a cylinder, a piston in said cylinder that is complementally threaded to fit the threads of said shaft, means for preventing rotation of said piston to effect movement thereof in one direction by said threaded shaft, said means being automatically releasable when the piston reaches one end of the threads on said shaft, and means for automatically returning said piston to the other end of the threads of said shaft.

2. A pump operating mechanism comprising a rotatable shaft with threads thereon, a cylinder, a piston in said cylinder that is complementally threaded to fit the threads of said shaft, means for preventing rotation of said piston to effect movement thereof in one direction by said threaded shaft, said means being automatically releasable when the piston reaches one end of the threads on said shaft, and means for effecting rotation of said piston at a rate of speed differing from the rate of speed of rotation of said threaded shaft.

3. A pump operating mechanism comprising a rotatable shaft with threads thereon, a cylinder, a piston in said cylinder that is complementally threaded to fit the threads of said shaft, means for preventing rotation of said piston to effect movement thereof in one direction by said threaded shaft, said means being automatically releasable when the piston reaches one end of the threads on said shaft, and means for rotating said piston at a rate of speed which is greater than the rate of speed of rotation of said threaded shaft.

4. A pump operating mechanism comprising a cylinder and a piston, a rotatable shaft threaded into said piston, mechanism for preventing rotation of said piston to effect longitudinal movement thereof in one direction by said threaded shaft, said mechanism being automatically releasable when the piston approaches one end of the threads on said shaft, means for rotating said piston after said release at a rate of speed differing from the rate of speed of rotation of said threaded shaft to effect return of said piston, said mechanism becoming automatically effective to prevent rotation of said piston at the end of said return.

5. In a pump operating mechanism embodying means for causing reciprocation of a piston, a spring for moving said piston in one direction, and means for automatically distorting said spring longitudinally and tortionally.

6. In a pump operating mechanism embodying means for causing reciprocation of a piston, a spring for moving said piston in one direction, and means for subjecting said spring to tension and tortion stresses.

7. A pump operating mechanism comprising a cylinder, a piston, a rotatable element, means for effecting longitudinal movement of said piston in said cylinder from said rotatable element, a spring, said spring being distortable tortionally by the longitudinal movement of said piston to effect return of said longitudinally moved piston to its original position.

8. A pump operating mechanism comprising a cylinder, a piston, a rotatable threaded shaft, means for effecting longitudinal movement of said piston in said cylinder from said rotatable threaded shaft, a resilient element, said resilient element being distortable longitudinally by the longitudinal movement of said piston to effect return of said longitudinally moved piston to its original position.

9. A device for converting rotative movement into reciprocatory movement which comprises an element adapted to be rotated, an element adapted to be reciprocated in one direction by said rotatable element, a resilient means, and means for tortionally stressing said resilient means during movement of said reciprocating element when under the influence of said rotatable element to effect movement of said reciprocatory element in a reverse direction.

10. In a device for converting rotative movement into reciprocatory motion, a rotatable element, an element adapted to be reciprocated in one direction by said rotatable element to deliver a force stroke, and means for returning said piston to initial position embodying a resilient member adapted to be tortionally stressed by movement of said reciprocated element.

11. A pump operating mechanism comprising a rotatable threaded shaft, a cylinder, a piston, a resilient element mounted concentric to said shaft and attached to said piston, means for rotating said shaft to produce movement of said piston in one direction and to tortionally stress said resilient element, means for releasing said piston from the influence of said shaft to allow said resilient element to return said piston to its initial position.

12. A pump operating mechanism comprising a threaded shaft, means for rotating said shaft, a cylinder, a piston structure so connected to the threads of said shaft that it will be moved in one direction in said cylinder by the rotation of said shaft, means for automatically releasing said piston from the moving effect of said threaded shaft, and means for moving said piston in the opposite direction in said cylinder.

13. A pump operating mechanism comprising a threaded shaft, means for rotating said shaft, a cylinder, a reciprocating piston structure so connected to the threads of said shaft that it will be moved in one direction in said cylinder by the rotation of said shaft, means for automatically releasing said piston from the moving effect of said threaded shaft at the end of such movement and means for returning said piston to the opposite end of the reciprocatory path.

14. A pump operating mechanism comprising a threaded shaft, means for rotating said shaft, a cylinder, a reciprocating piston structure so connected to the threads of said shaft that it will be moved in one direction in said cylinder by the rotation of said shaft, means for automatically releasing said piston from the moving effect of said shaft at a predetermined point and means for automatically returning said piston to the opposite end of the reciprocatory path.

15. A pump operating mechanism comprising a threaded shaft, means for rotating said shaft, a cylinder, a piston structure so connected to the threaded shaft that it will be moved in one direction in said cylinder by the rotation of said shaft, and means for storing energy for moving the piston in the opposite direction by the first movement of the piston.

16. A pump operating mechanism comprising a cylinder, a piston, a rotatable threaded shaft cooperating with said piston, means for rotating said shaft, means for preventing rotation of said piston whereby it is moved in one direction in said cylinder by the rotation of said threaded shaft, and means for permitting rotation of said piston at one end of its reciprocation whereby said piston is moved in the opposite direction in said cylinder.

17. A pump operating mechanism comprising a cylinder, a piston, a rotatable threaded shaft cooperating with said piston, means for rotating said shaft, means for preventing rotation of said piston whereby it is reciprocated by the rotation of said threaded shaft, and means for automatically releasing said piston from the moving effect of said threaded shaft and returning it to initial position.

In testimony whereof I hereby affix my signature.

WILLIAM D. BELL.